(12) United States Patent
Yuan et al.

(10) Patent No.: US 12,333,248 B2
(45) Date of Patent: Jun. 17, 2025

(54) VISUALIZATION OF THE IMPACT OF TRAINING DATA

(71) Applicant: International Business Machines Corporation, Armonk, NY (US)

(72) Inventors: Zhong Fang Yuan, Xi'an (CN); Tong Liu, Xi'an (CN); Ting Yao Liu, Ningbo (CN); Li Juan Gao, Xi'an (CN); Hai Bo Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 17/589,511

(22) Filed: Jan. 31, 2022

(65) Prior Publication Data
US 2023/0244868 A1    Aug. 3, 2023

(51) Int. Cl.
*G06F 40/279* (2020.01)
*G06F 40/117* (2020.01)

(52) U.S. Cl.
CPC .......... *G06F 40/279* (2020.01); *G06F 40/117* (2020.01)

(58) Field of Classification Search
CPC .... G06F 40/279; G06F 40/117; G06F 40/284; G06F 40/30
See application file for complete search history.

(56) References Cited

U.S. PATENT DOCUMENTS

| | | | |
|---|---|---|---|
| 10,719,301 B1 | 7/2020 | Dasgupta et al. | |
| 11,868,903 B2 * | 1/2024 | Sweeney | G06F 40/30 |
| 2002/0081024 A1 * | 6/2002 | Park | G06F 16/5838 |
| | | | 382/165 |
| 2006/0130120 A1 * | 6/2006 | Brandyberry | H04N 21/25891 |
| | | | 725/136 |
| 2007/0043567 A1 * | 2/2007 | Gao | G10L 15/26 |
| | | | 704/E15.045 |
| 2009/0184978 A1 * | 7/2009 | Blonde | H04N 9/3179 |
| | | | 345/647 |
| 2015/0356459 A1 * | 12/2015 | Ghosh | G06N 5/02 |
| | | | 706/12 |
| 2017/0058666 A1 | 3/2017 | Chen et al. | |
| 2019/0080507 A1 | 3/2019 | Griffith | |
| 2019/0325276 A1 * | 10/2019 | Fu | G06N 3/084 |
| 2020/0342051 A1 | 10/2020 | Ghatage et al. | |

FOREIGN PATENT DOCUMENTS

| | | |
|---|---|---|
| CN | 106909945 A | 6/2017 |
| CN | 112418408 A | 2/2021 |

\* cited by examiner

*Primary Examiner* — Daniel C Washburn
*Assistant Examiner* — Paul J. Mueller
(74) *Attorney, Agent, or Firm* — Harrity & Harrity, LLP

(57) ABSTRACT

An example operation may include one or more of executing a machine learning model on training data, where the training data comprises a plurality of word strings, identifying words within the training data that are extracted by the machine learning model during the executing, determining a color for the machine learning model based on the identified words and a predefined mapping of words to colors, and rendering, via a user interface, a label associated with the machine learning model in the determined color for the machine learning model.

20 Claims, 14 Drawing Sheets
(4 of 14 Drawing Sheet(s) Filed in Color)

200

370

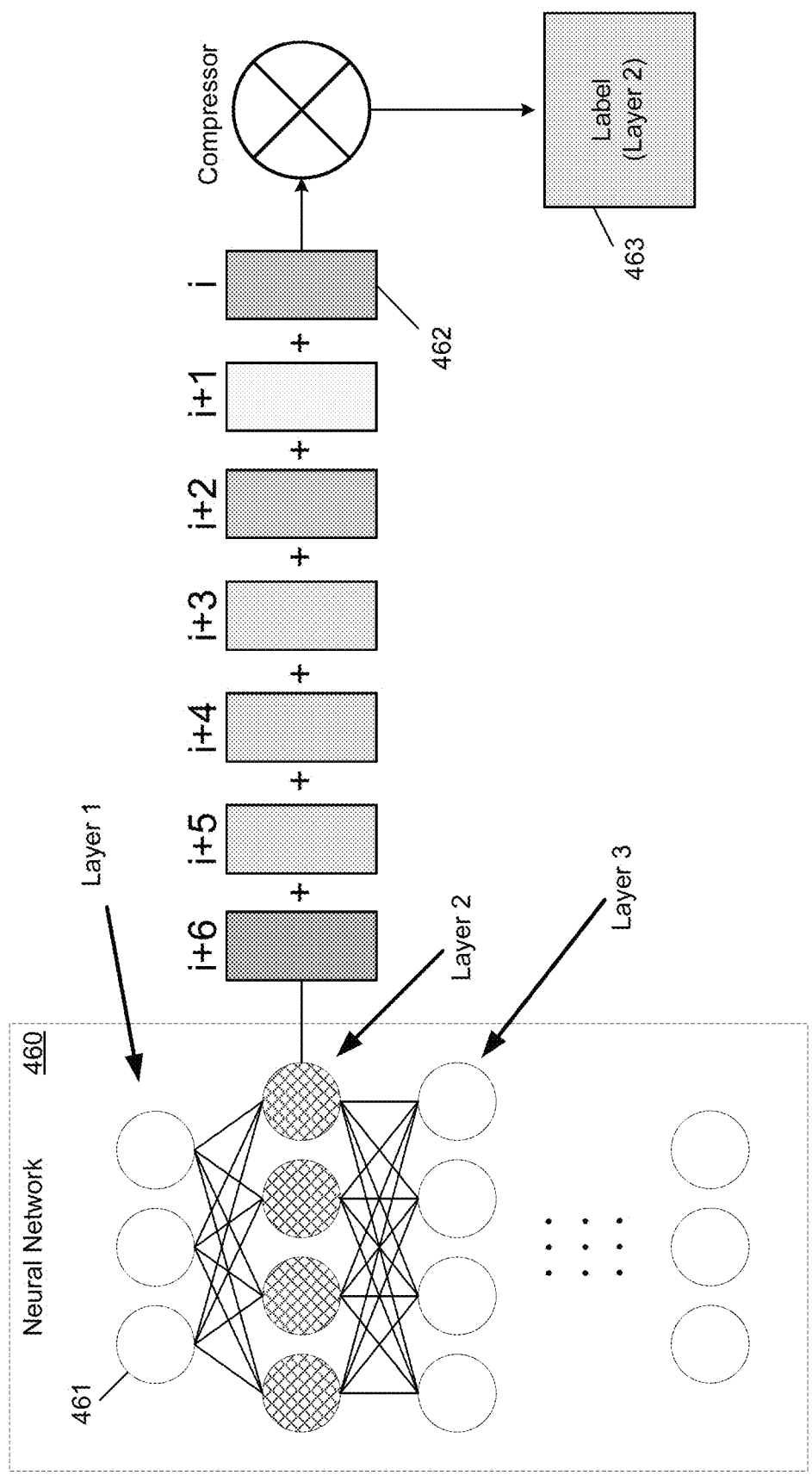

VISUALIZATION OF THE IMPACT OF TRAINING DATA

BACKGROUND

A machine learning model may be implemented via a neural network. One example is a deep learning neural network that is constructed from a network of nodes. One such example of a deep learning network is a text classification model. In this example, the nodes may be arranged in various layers where each layer extracts text and uses it for training the model. Data input to a first layer of the neural network is processed through the various layers until it reaches an output layer which generates a final prediction (e.g., predicted classification, etc.) During training of the neural network, a large corpus of input data (e.g., thousands or even millions of training data strings, etc.) may be fed into the neural network. This process may take thousands of iterations of the neural network. Each iteration the neural network's predictions become a little more accurate as additional data is consumed.

One of the drawbacks of training a neural network is that it can be difficult to know which features of training data are going to impact the neural network. In other words, it is difficult for a user to comprehend how the machine learning model interacts with the input training data because the neural network is essentially a black box calculation. The training data that goes through the neural network is unreadable because it is previously converted into vector form. As a result, it is difficult to track the input data as it goes through the model. Because of the lack of understanding of the impact provided by the training data, the training process is inefficient. For example, it may take a data scientist a few days of executing the model on a large corpus of training data to achieve a desired level of prediction accuracy for the model, when the same level of predictive accuracy could have been generated in less than half the time with more impactful training data.

SUMMARY

One example embodiment provides an apparatus that includes a processor configured to execute a machine learning model on training data, where the training data comprises a plurality of word strings, identify words within the training data that are extracted by the machine learning model via the execution, determine a color for the machine learning model based on the identified words and a predefined mapping of words to colors, and render, via a user interface, a label associated with the machine learning model in the determined color for the machine learning model.

Another example embodiment provides a method that includes one or more of executing a machine learning model on training data, where the training data comprises a plurality of word strings, identifying words within the training data that are extracted by the machine learning model during the executing, determining a color for the machine learning model based on the identified words and a predefined mapping of words to colors, and rendering, via a user interface, a label associated with the machine learning model in the determined color for the machine learning model.

A further example embodiment provides a computer-readable medium comprising instructions, that when read by a processor, cause the processor to perform one or more of executing a machine learning model on training data, where the training data comprises a plurality of word strings, identifying words within the training data that are extracted by the machine learning model during the executing, determining a color for the machine learning model based on the identified words and a predefined mapping of words to colors, and rendering, via a user interface, a label associated with the machine learning model in the determined color for the machine learning model.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4C is a diagram illustrating a process of labelling a layer of a neural network with a color according to an example embodiment.

DETAILED DESCRIPTION

Figure 1:
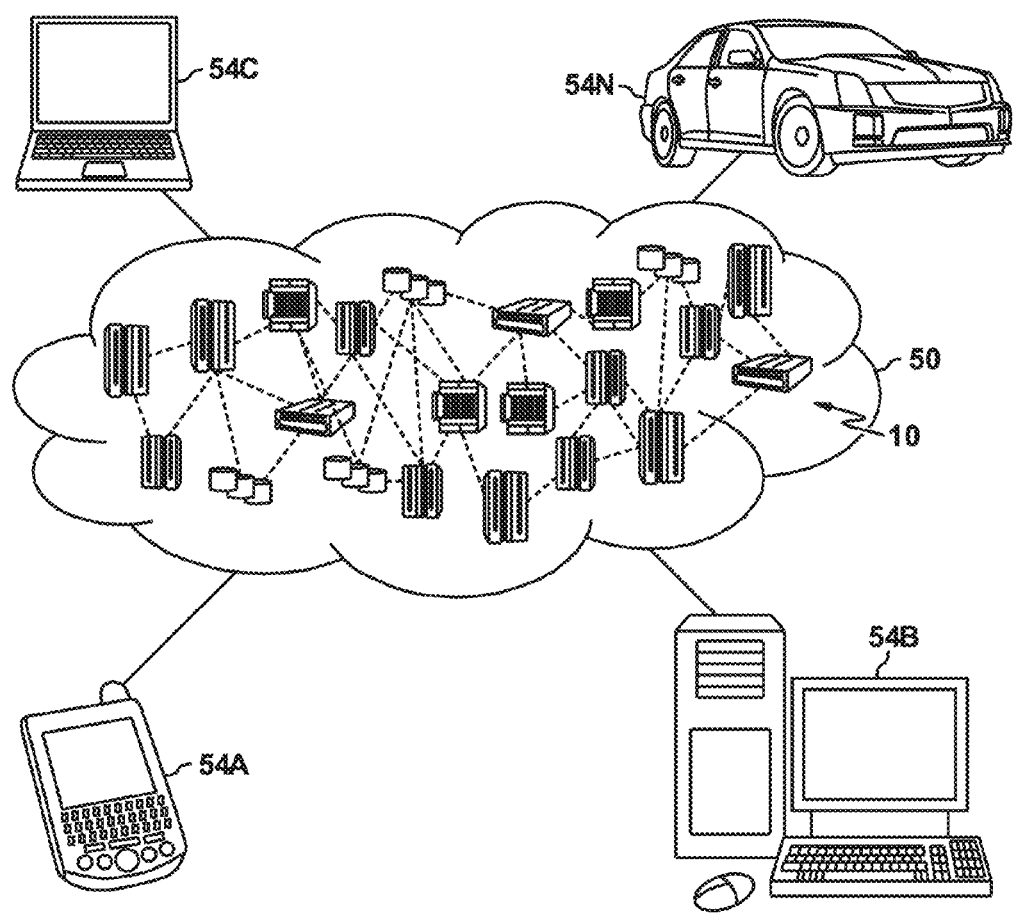
FIG. 1 is a diagram illustrating a cloud computing environment that interacts with various devices according to an example embodiment.

It is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

The example embodiments are directed to a model training environment, such as a cloud platform, that generates a visualization of data as it flows through and trains a machine learning model. This flow is referred to herein as a data isotope. The idea behind this process is to visualize how the training data impacts various parts of the machine learning model during the training process. For example, different pieces of training data (e.g., words, strings, sentences, text, etc.) may be assigned different colors from among a color gamut.

During the training process, the machine learning model may be iteratively executed on different sets of training data with the goal of increasing the predictive accuracy of the model at each iteration until a predetermined accuracy threshold is reached or the training data is finished. The training data that is most impactful on the training of the machine learning model can be identified by the system. For example, the words that are extracted at each node/layer of a neural network may be identified and passed to the system described herein. Furthermore, the system may then create a visualization of the machine learning model in color based on which training data has the most impact on which portions of the machine learning model. For example, the visualization process may identify a combined color for a particular layer of the machine learning model based on a combination/accumulation of words that are extracted by that layer during the training and the color(s) that are mapped to those words. The colors can be combined into a single color/label that can then be rendered within a graphical element that represents the layer of the machine learning model. This same process may be repeated for each layer of the model, thereby providing a viewer with an understanding of which training data is affecting/impacting which sections of the machine learning model.

The mapping of the training data to colors may be performed by a vector decomposition process. In this example, the corpus of training data (i.e., words) is used to generate corpus of word vectors such as commonly used in word to vector (word2vec) applications. However, in this case, the word vectors are then translated into colors by converting the vector into a point in the color gamut such as a multi-dimensional color gamut. The color gamut may be large enough such that each word can be mapped to a different color.

Furthermore, the words of the training data may be mapped to unique colors of the identified training data can then be used by the system to render a label associated with the machine learning model in that same color. For example, the user interface may color a label of the model, a label of a node and/or a layer within a neural network, or the like, within the user interface thereby enabling a viewer to quickly understand what training data has the most impact on training of the machine learning model. The process can be performed in real-time. Accordingly, the operator/data scientist responsible for training the model can quickly identify which training data is most impactful on the training of the model, and use similar training data to expedite the training process thereby significantly reducing the amount of time that it takes to train the machine learning model.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Examples of cloud computing characteristics that may be associated with the example embodiments include the following:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Examples of service models that may be associated with the example embodiments include the following:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Examples of deployment models that may be associated with the example embodiments include the following:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that cloud computing nodes 10 and cloud computing environment 50 can communicate with any type of computerized device over any type of network and/or network addressable connection (e.g., using a web browser).

Figure 2A:
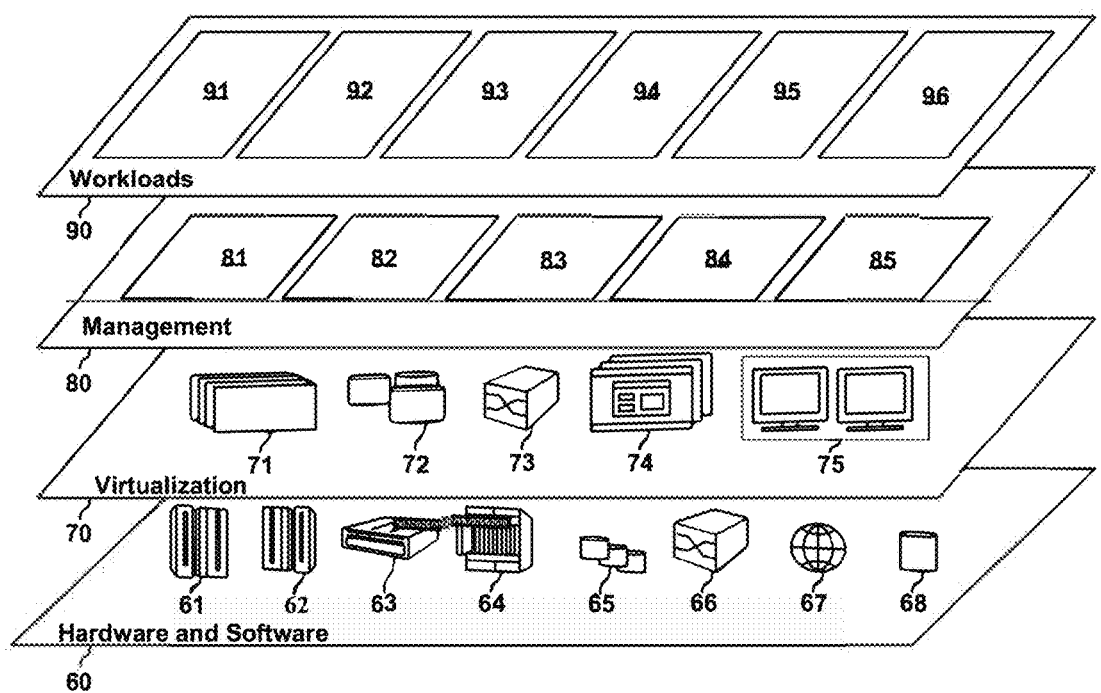
FIG. 2A is a diagram illustrating abstraction model layers of a cloud computing environment according to an example embodiment.

Referring now to FIG. 2A, a set of functional abstraction layers provided by cloud computing environment 50 (FIG. 1) is shown. It should be understood in advance that the components, layers, and functions shown in FIG. 2A are intended to be illustrative only and embodiments of the invention are not limited thereto. As depicted, the following layers and corresponding functions are provided: Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workload layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a training data impact visualization process 96.

As previously noted, due to the black-box characteristics of a machine learning model during training, it is difficult for a user responsible for the training to understand how the training data is impacting the machine learning model. In other words, users cannot see how the input data is travelling through the model, nor can the user visualize which data has the most impact on the training of the model. As a result of this, the training process can be very inefficient causing delays on the amount of time it takes the model to reach a predetermined level of predictive accuracy. However, the example embodiments address these drawbacks.

Figure 2B:
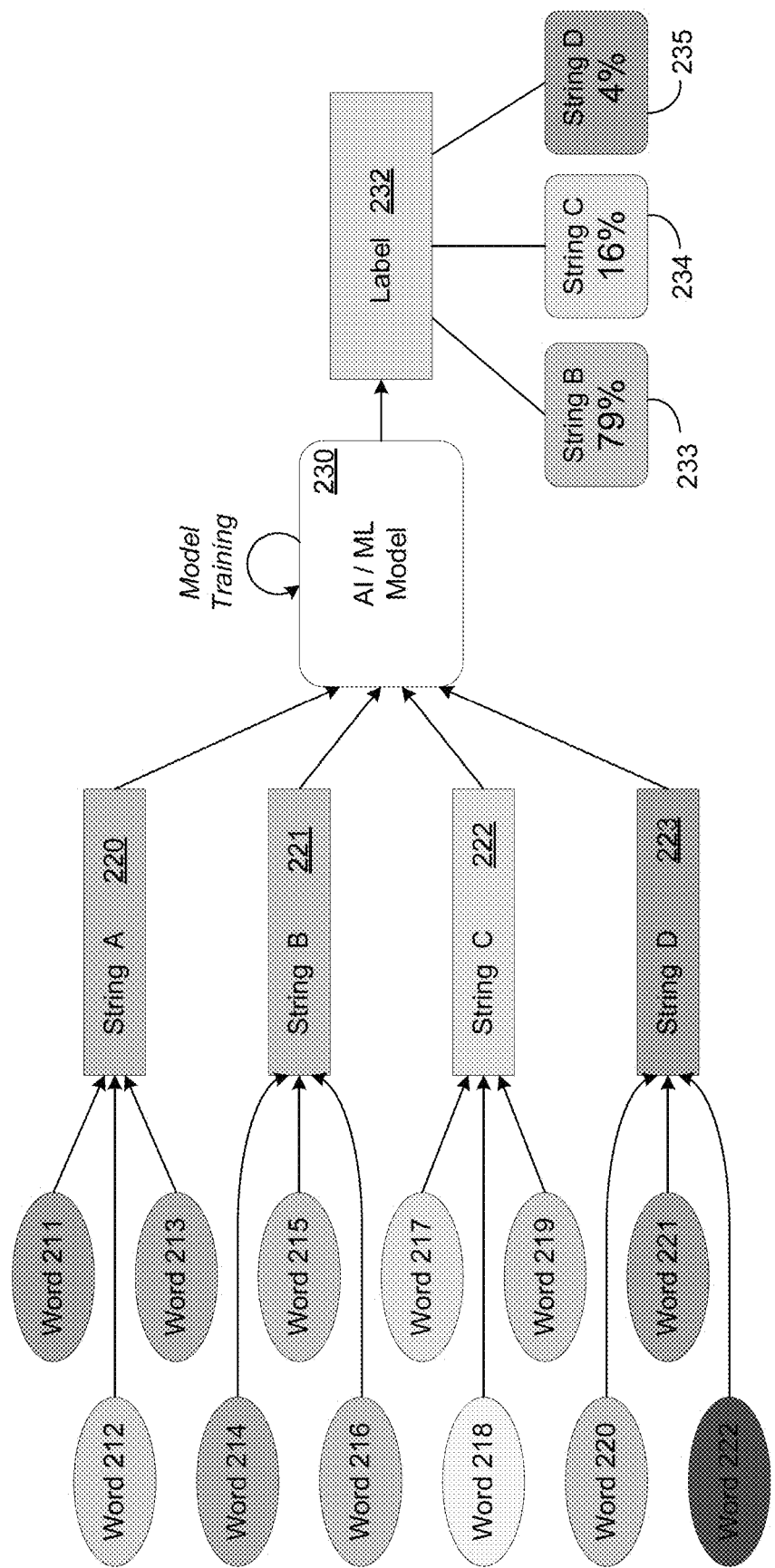
FIG. 2B is a diagram illustrating a process of generating a visualization of the impact that training data has on a machine learning model according to an example embodiment.

In the example of FIG. 2B, the cloud platform may include a training platform for training machine learning models. In this example, the training data impact visualization process 96 may be implemented within a service or application hosted by the cloud platform in association with or otherwise integrated into the model training platform. As machine learning models are trained, the training data impact visualization process 96 may be called (e.g., via an API, an HTTP command, etc.) and may generate a display/visualization of the flow of training data with respect to the model based on color. The visualization that is generated may show the flow of data, in the form of color, as it moves through and impacts the training of the internal components of the model such as deep learning network layers and/or nodes within a neural network. As a result, the user can easily understand which training data has the most impact on the training of the machine learning model by simply following the colors in the data flow.

For example, FIG. 2B illustrates a process 210 of generating a visualization of the impact that training data has on a machine learning model 230 according to an example embodiment. Referring to FIG. 2B, a corpus of training data is represented by a plurality of strings 220, 221, 222, and 223. The plurality of strings 220-223 are made up of a plurality of words 211, 212, 213, 214, 215, 216, 217, 218, 219, 220, 221, and 222 where each string includes three words, but this is just for purposes of example. Each word from among the plurality of words 211-222 may be assigned a unique color from a predefined color gamut based on the unique content therein as further described in the process of FIG. 4B. In particular, the word can be mapped into a vector space where similar words are located close to each other. Next, the vector can be mapped to a particular pixel or location within the color gamut based on vector decomposition. This method adopts the idea of Word2Vec. In the theory of Word2Vec, the vectors represented by similar words are positioned in a similar location in the vector space Similarly, words positioned in a similar location in the vector space will be assigned colors in the 3D color gamut that are also similar.

For example, the word "King" can be uniquely represented as a 300-dimensional array in the vector space, and the word "Queen" can also be uniquely represented as a 300-dimensional array in the vector space. Here, these two vectors have characteristics of similar words or words with strong correlation. As a result, the two vectors will have high cosine similarity in the 300-dimensional vector space. For example, cos (wordvec(King),wordvec(Queen))=1.

In FIG. 2B, the training data impact visualization process 96 may analyze which words flow through the model and generate a label 232 based on the colors assigned to those words. For example, the label 232 may be used to represent a particular layer in the machine learning model 230 (such as a layer in a text classification neural network). Here, the layer of the neural network may refer to an embedding layer, a convolution layer, a max-pooling layer, a concatenation layer, a softmax layer, and the like. Neural networks are designed to process vectors. In the example embodiments, the words are converted into vectors thereby enabling them to be processed by the machine learning model 230. In addition, the example embodiments also map the vector to a color. The training data impact visualization process 96 may identify which words are extracted by a particular layer of the machine learning model 230 during a training iteration, and display an overall color for the layer based on a combination/accumulation of colors that are mapped to the vectors of the identified words extracted by the particular layer. This same process may be performed for each layer of the machine learning model 230 (e.g., neural network) to arrive at a layer-by-layer representation of the machine learning model 230 in color. An example of a layer-by-layer representation of a neural network 460 is shown in FIG. 4D, as further described below.

In addition to generating the label 232 in color, the training data impact visualization process 96 may also identify which string or strings have the most impact on the training of the layer of the machine learning model 230. Here, the training data impact visualization process 96 may create sub-labels 233, 234, and 235, in color, which each represent different strings 220, 221, and 222 of the training data, and which show the amount/percentage of impact that each string of the training data had on the training of the machine learning model 230 (e.g., a particular layer of the machine learning model, etc.) during that iteration.

The visualization process may essentially create a "visual data isotope" which tracks and shows the flow and the proportion of data in the neural network as it is consumed during the training process. Its purpose is to determine which data is specifically affected by the deep neural network in the process of training and inference. The so-called "data isotope" can be analogized to isotopes in the chemical field. It has the characteristics of stable properties. In the feedforward and backward matrix calculations of neural networks, its values do not change much. Thus, the visualized "data isotope" has strong visualization characteristics and isotopic stability. Because of this, the system can analyze the proportion of the "data isotope" in the final result, and then use the visualization to determine the different data influences on the final result. Thus, a user can visualize which data is more effective/more important in training the machine learning model.

The process may be divided into two steps. During a first step, a definition and construction of a data isotope is generated. During a second step, the data isotope is used to trace the source of training data into the various internal components of the machine learning model. Regarding data isotope, it is essentially a tensor, but this tensor has "isotopic" properties. For example, in a series of neural network operations, the data isotope does not follow the various operations of the neural network (such as feedforward, backward propagation, etc.) nor change a stability in the mathematical sense.

The example embodiments use a combination of matrix decomposition and HSV color vector visualization to visualize the flow of data within the training of a machine learning model. Furthermore, the process can use the flow of colors as a medium to clearly observe which features play what role in which step. The example embodiments make it possible to interpret the black-box nature of the training of a neural network. Accordingly, it is possible to observe what kind of training data has the most impact on the final result, which can be used to optimize additional training of the deep learning model.

FIGS. 3A-3E provide various examples of additional features that may be used in association with the cloud computing environment.

Figure 3A:
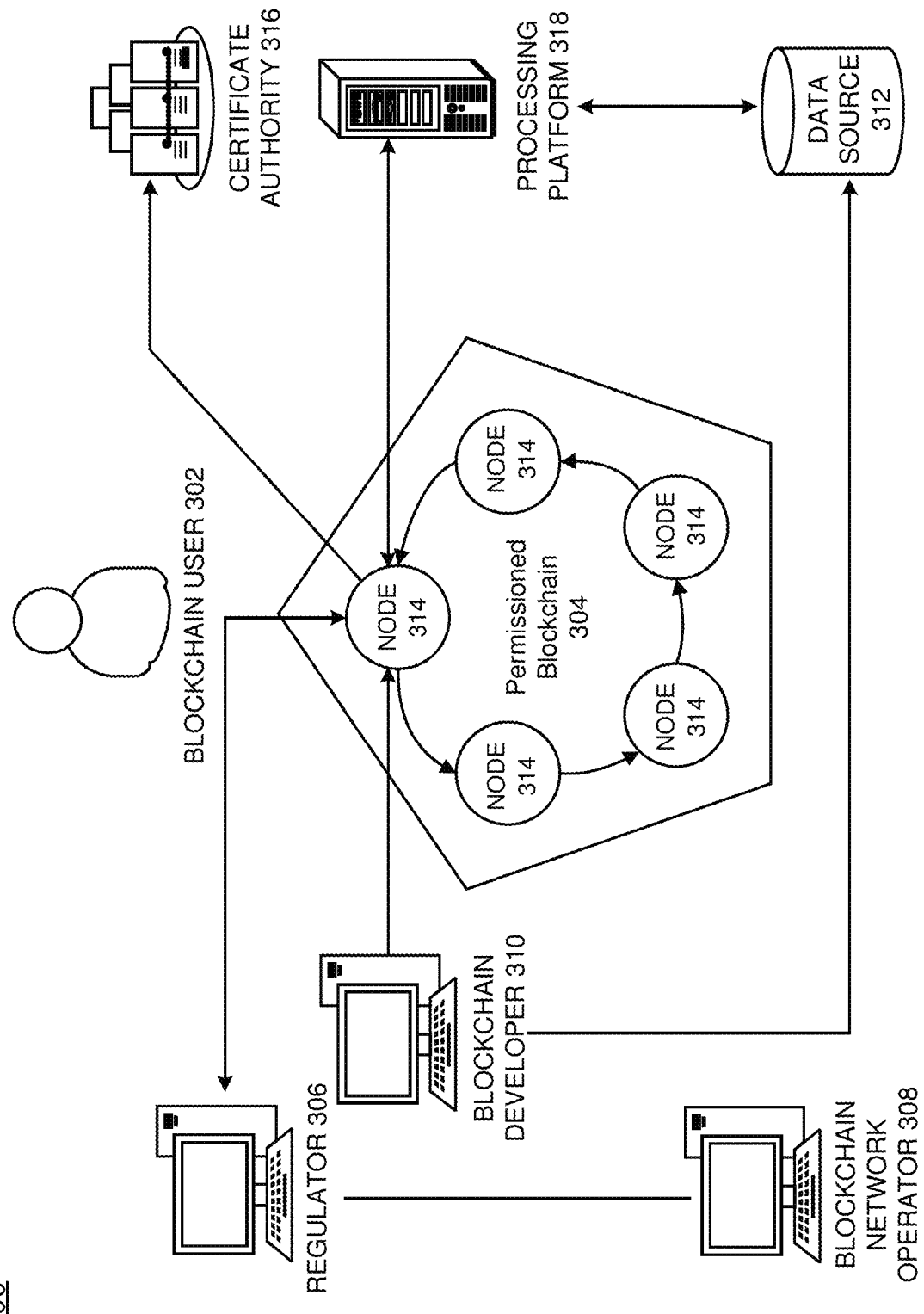
FIGS. 3A-3C are diagrams illustrating examples of a permissioned network according to example embodiments.

FIG. 3A illustrates an example of a permissioned blockchain network 300, which features a distributed, decentralized peer-to-peer architecture. The blockchain network may interact with the cloud computing environment 50, allowing additional functionality such as peer-to-peer authentication for data written to a distributed ledger. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
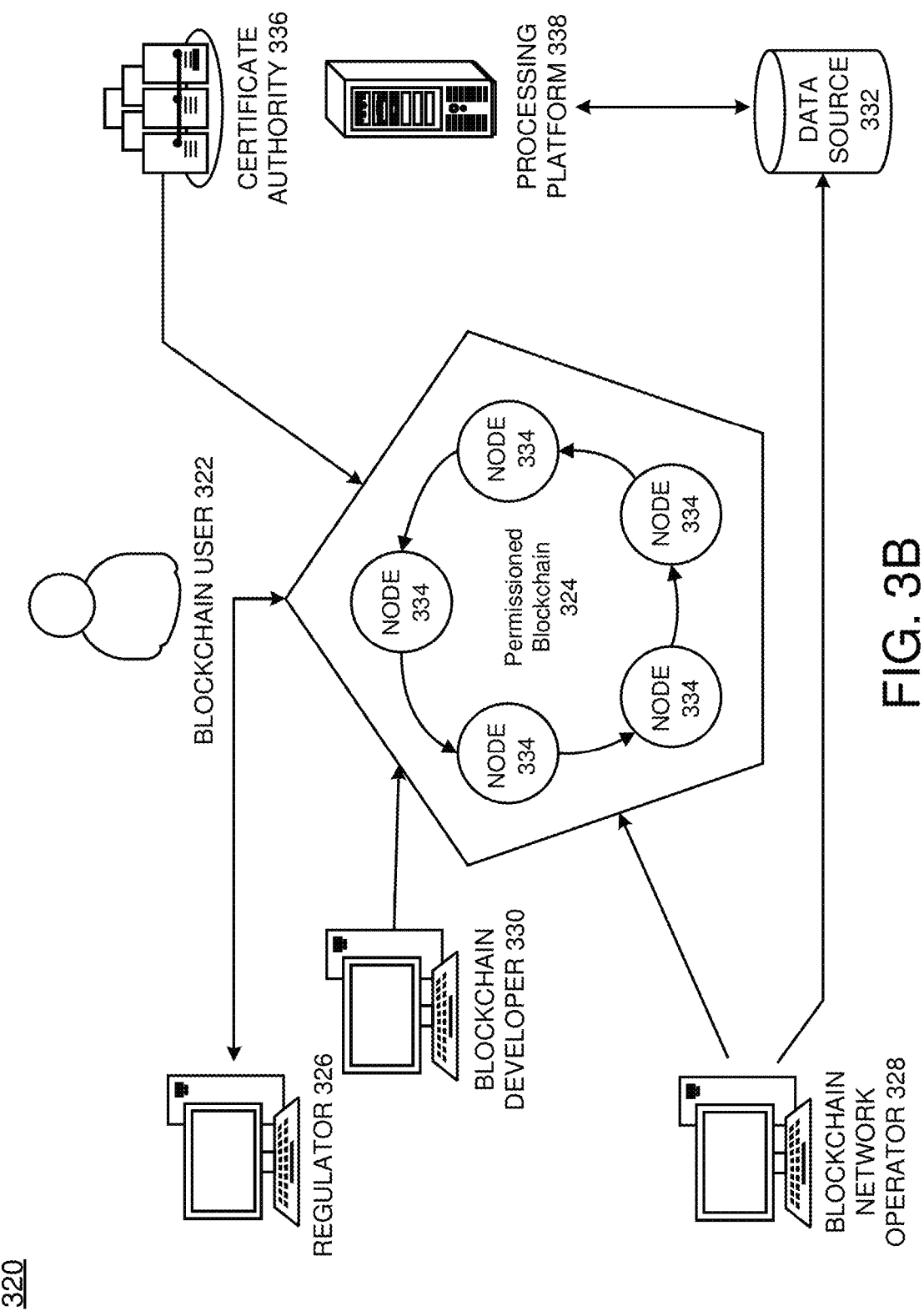

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
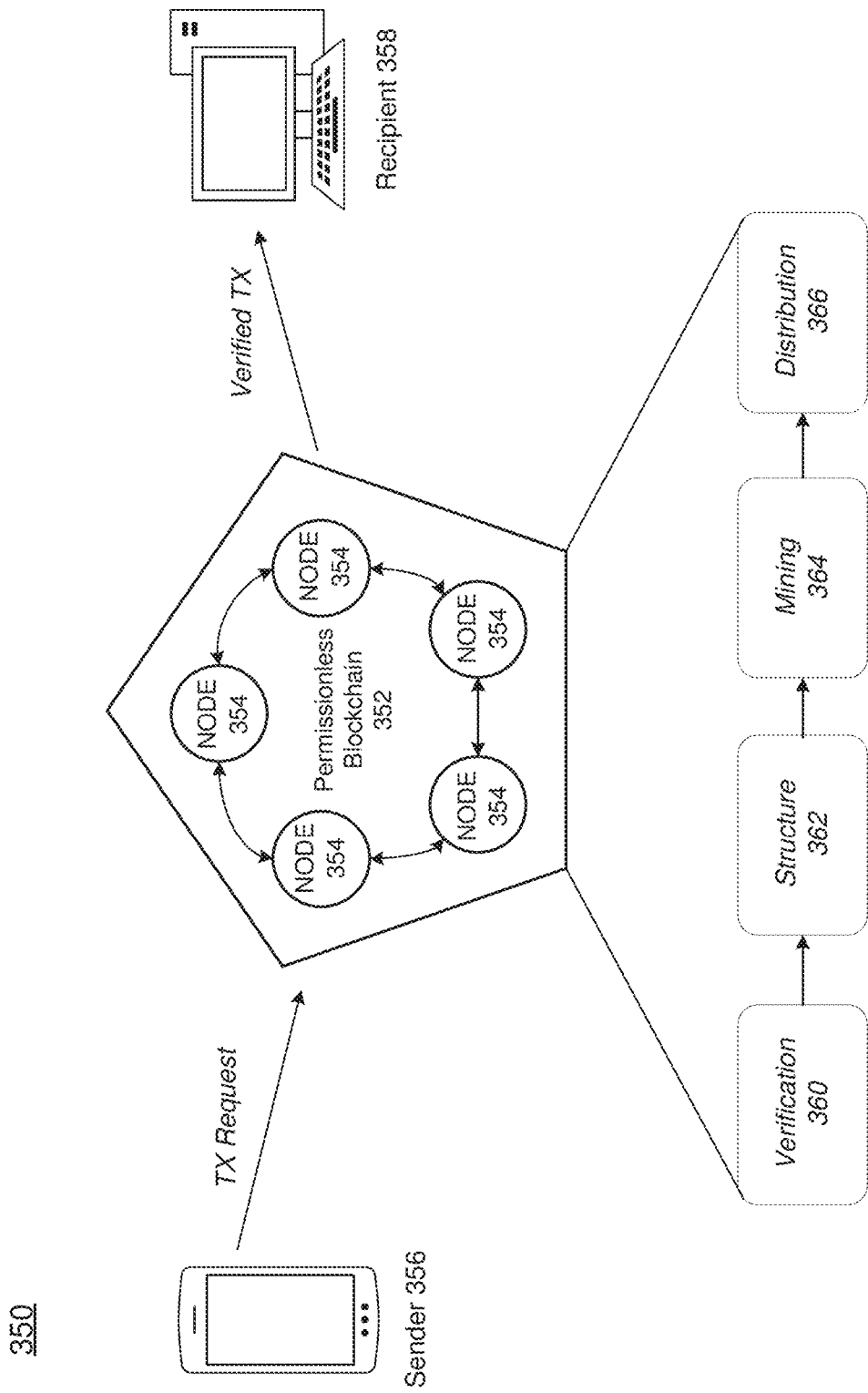

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the POW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 3D:
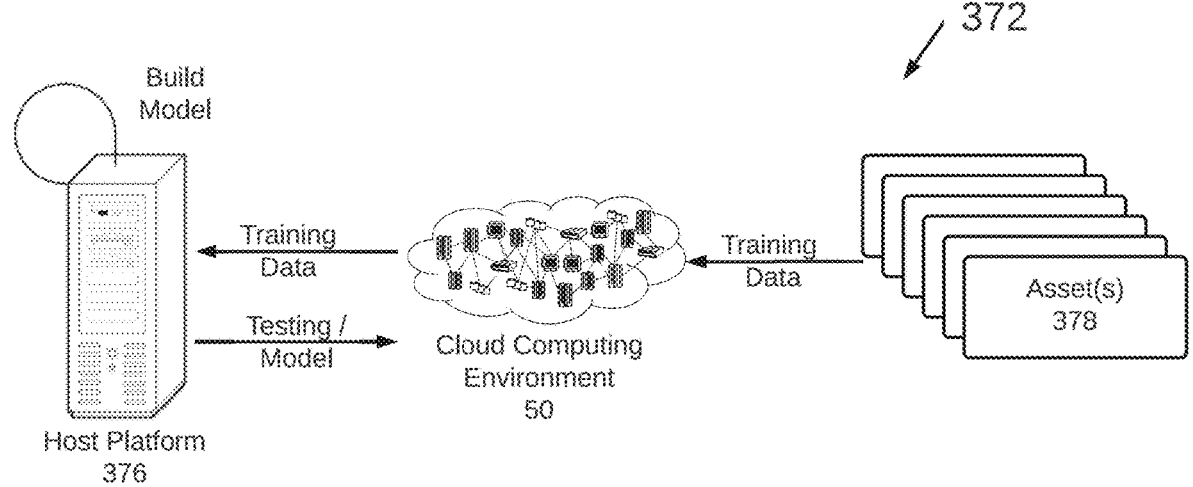
FIG. 3D is a diagram illustrating machine learning process via a cloud computing platform according to an example embodiment.
Figure 3D:
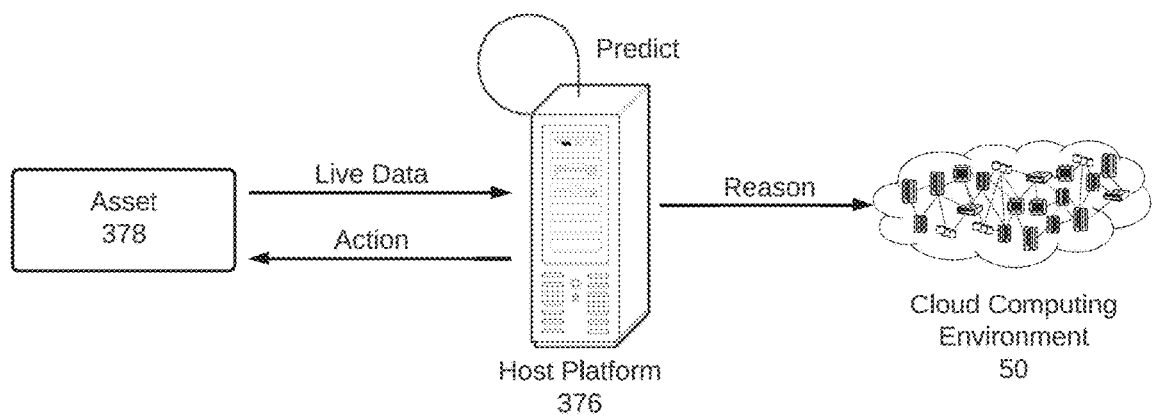
Figure 3E:
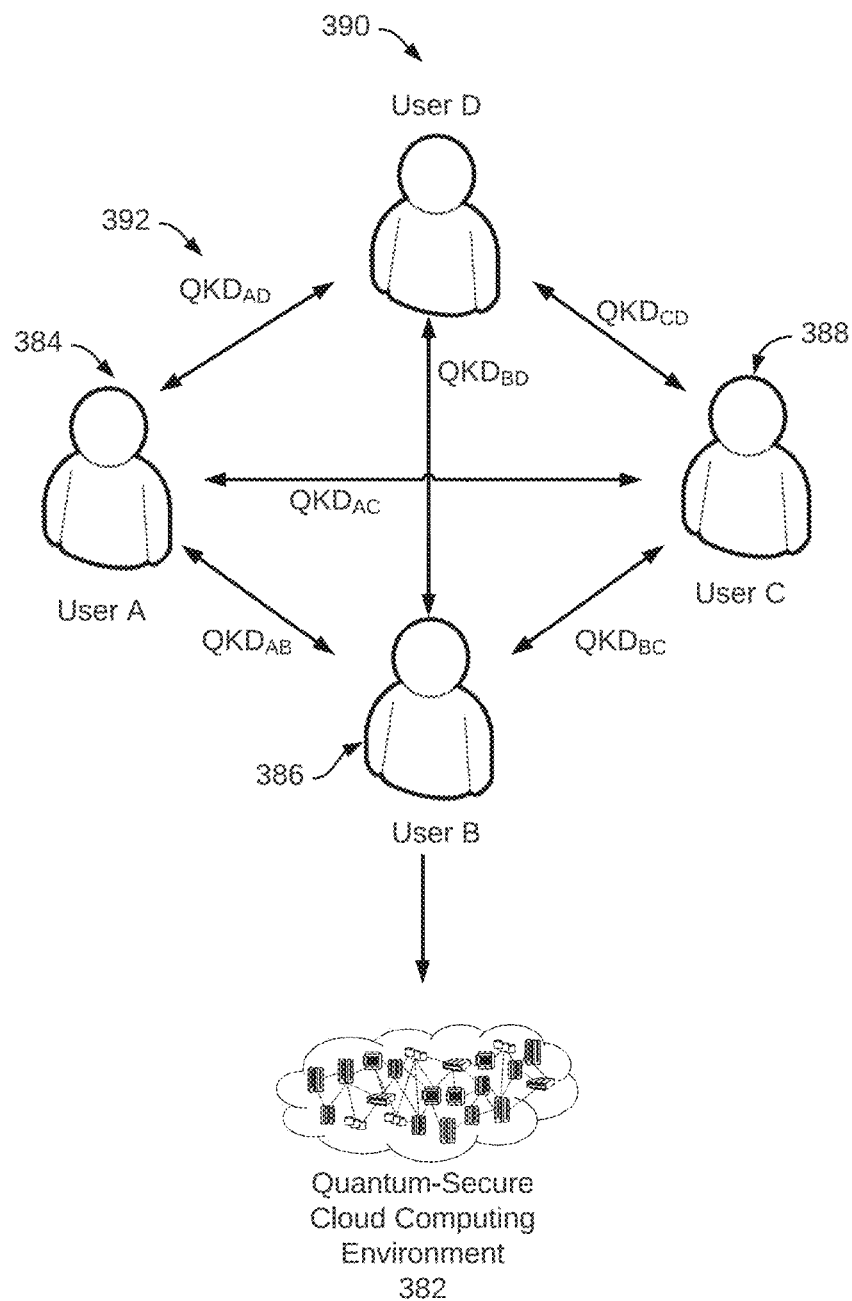
FIG. 3E is a diagram illustrating a quantum computing environment associated with a cloud computing platform according to an example embodiment.

FIGS. 3D and 3E illustrate additional examples of use cases for cloud computing that may be incorporated and used herein. FIG. 3D illustrates an example 370 of a cloud computing environment 50 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 3D, a host platform 376 builds and deploys a machine learning model for predictive monitoring of assets 378. Here, the host platform 366 may be a cloud platform, an industrial server, a web server, a personal computer, a user device, and the like. Assets 378 can be any type of asset (e.g., machine or equipment, etc.) such as an aircraft, locomotive, turbine, medical machinery and equipment, oil and gas equipment, boats, ships, vehicles, and the like. As another example, assets 378 may be non-tangible assets such as stocks, currency, digital coins, insurance, or the like.

The cloud computing environment 50 can be used to significantly improve both a training process 372 of the machine learning model and a predictive process 374 based on a trained machine learning model. For example, in 372, rather than requiring a data scientist/engineer or another user to collect the data, historical data may be stored by the assets 378 themselves (or through an intermediary, not shown) on the cloud computing environment 50. This can significantly reduce the collection time needed by the host platform 376 when performing predictive model training. For example, data can be directly and reliably transferred straight from its place of origin to the cloud computing environment 50. By using the cloud computing environment 50 to ensure the security and ownership of the collected data, smart contracts may directly send the data from the assets to the individuals that use the data for building a machine learning model. This allows for sharing of data among the assets 378.

Furthermore, training of the machine learning model on the collected data may take rounds of refinement and testing by the host platform 376. Each round may be based on additional data or data that was not previously considered to help expand the knowledge of the machine learning model. In 372, the different training and testing steps (and the data associated therewith) may be stored on the cloud computing environment 50 by the host platform 376. Each refinement of the machine learning model (e.g., changes in variables, weights, etc.) may be stored in the cloud computing environment 50 to provide verifiable proof of how the model was trained and what data was used to train the model. For example, the machine learning model may be stored on a blockchain to provide verifiable proof. Furthermore, when the host platform 376 has achieved a trained model, the resulting model may be stored on the cloud computing environment 50.

After the model has been trained, it may be deployed to a live environment where it can make predictions/decisions based on the execution of the final trained machine learning model. For example, in 374, the machine learning model may be used for condition-based maintenance (CBM) for an asset such as an aircraft, a wind turbine, a healthcare machine, and the like. In this example, data fed back from asset 378 may be input into the machine learning model and used to make event predictions such as failure events, error codes, and the like. Determinations made by the execution of the machine learning model at the host platform 376 may be stored on the cloud computing environment 50 to provide auditable/verifiable proof. As one non-limiting example, the machine learning model may predict a future breakdown/failure to a part of the asset 378 and create an alert or a notification to replace the part. The data behind this decision may be stored by the host platform 376 and/or on the cloud computing environment 50. In one embodiment the features and/or the actions described and/or depicted herein can occur on or with respect to the cloud computing environment 50.

FIG. 3E illustrates an example 380 of a quantum-secure cloud computing environment 382, which implements quantum key distribution (QKD) to protect against a quantum computing attack. In this example, cloud computing users can verify each other's identities using QKD. This sends information using quantum particles such as photons, which cannot be copied by an eavesdropper without destroying them. In this way, a sender, and a receiver through the cloud computing environment can be sure of each other's identity.

In the example of FIG. 3E, four users are present 384, 386, 388, and 390. Each pair of users may share a secret key 392 (i.e., a QKD) between themselves. Since there are four nodes in this example, six pairs of nodes exist, and therefore six different secret keys 392 are used including QKDAB, QKDAC, QKDAD, QKDBC, QKDBD, and QKDCD. Each pair can create a QKD by sending information using quantum particles such as photons, which cannot be copied by an eavesdropper without destroying them. In this way, a pair of users can be sure of each other's identity.

The operation of the cloud computing environment 382 is based on two procedures (i) creation of transactions, and (ii) construction of blocks that aggregate the new transactions. New transactions may be created similar to a traditional network, such as a blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 384-390) authenticate the transaction by providing their shared secret key 392 (QKD). This quantum signature can be attached to every transaction making it exceedingly difficult to be tampered with. Each node checks its entries with respect to a local copy of the cloud computing environment 382 to verify that each transaction has sufficient funds.

Figure 4A:
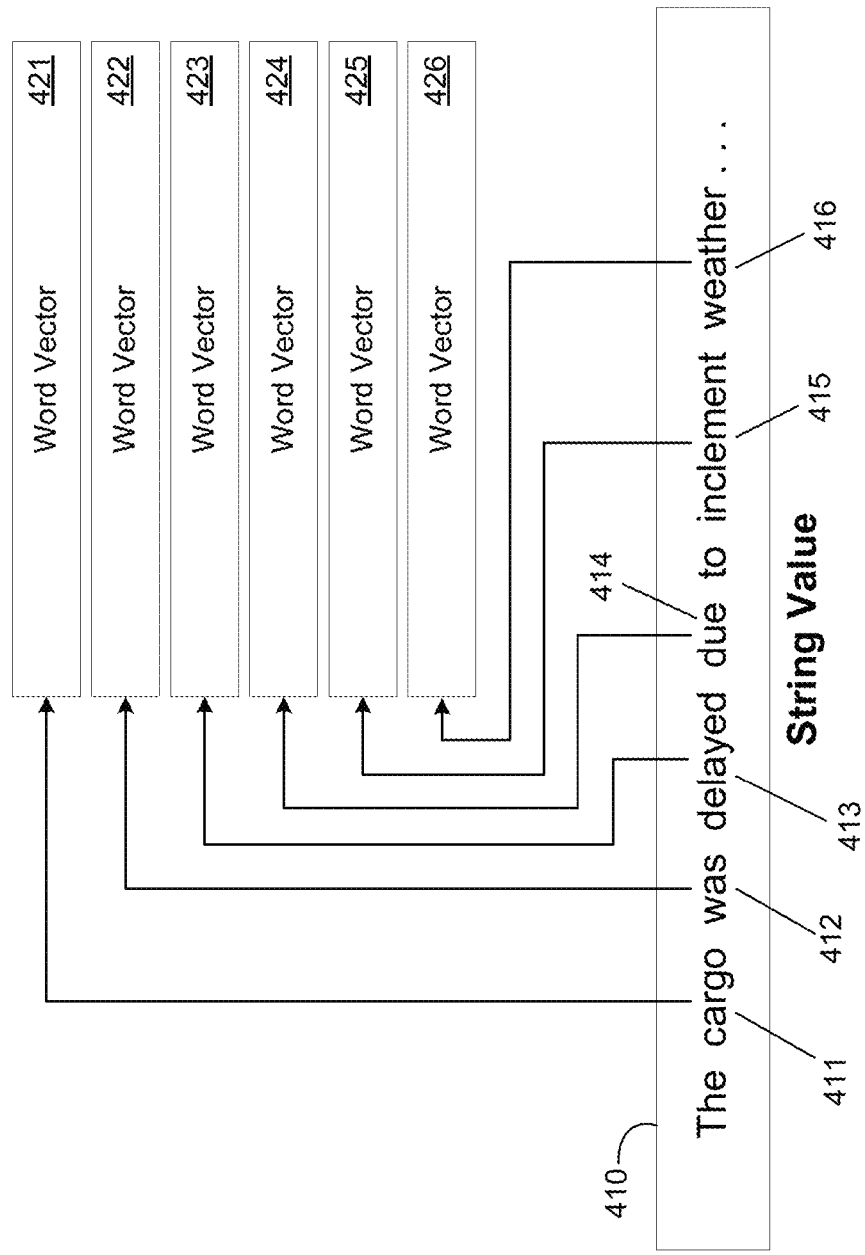
FIG. 4A is a diagram illustrating a process of converting a string of text into a series of word vectors according to an example embodiment.

FIG. 4A illustrates a process 400 of converting a string of text 410 into a series of word vectors 421-426 according to an example embodiment. Referring to FIG. 4A, each word within a string (e.g., a word string) such as the string of text 410 may be converted into its own word vector. Here, the words 411, 412, 413, 414, 415, and 416 are converted into the word vectors 421, 422, 423, 424, 425, and 426, respectively. This process may be performed by a word-to-vector algorithm, also referred to herein as word2vec. The word2vec algorithm may be a machine learning model that learns word associations within the original corpus of training data, and can use this to detect synonymous words within the training data. The word2vec algorithm may receive as input a corpus of training data (e.g., word strings) including the string of text 410 and convert the words within the strings into word vectors (also referred to as feature vectors) including the word vectors 421-426.

The purpose and usefulness of the Word2 Vec algorithm is to group the vectors of similar words together in vector space. That is, it detects similarities mathematically. Here, the Word2vec algorithm may create vectors that include distributed numerical representations of word features, features such as the context of individual words. It does so without human intervention. Given enough data, usage, and contexts, the Word2vec algorithm can make highly accurate guesses about a word's meaning based on past appearances. Those guesses can be used to establish a word's association with other words (e.g., "foot" is to "shoe" as "hand" is to "glove" etc.), cluster data sets and classify them by topic, and the like.

Figure 4B:
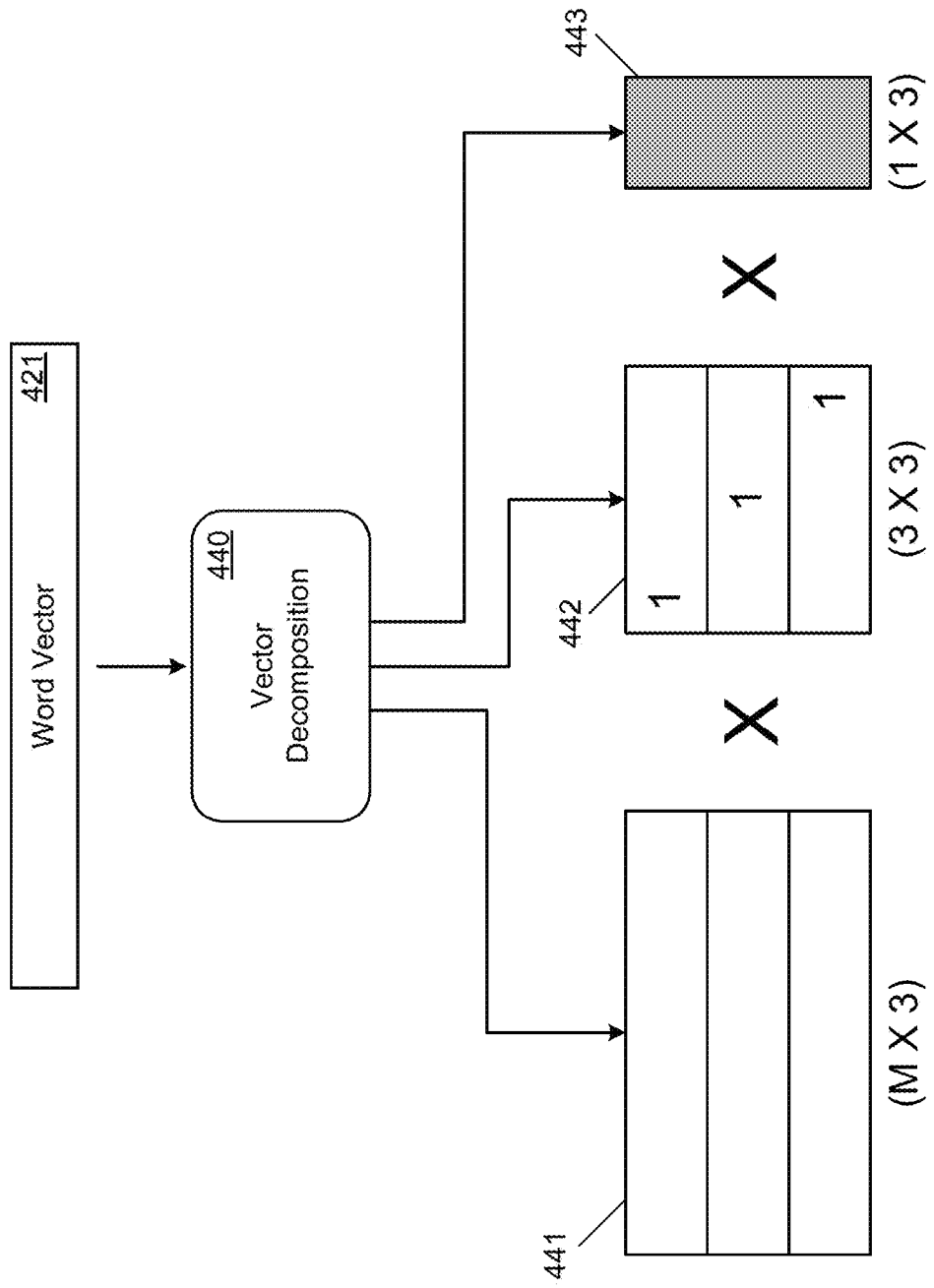
FIG. 4B is a diagram illustrating a process of decomposing a word vector to create a mapping to a color within the color gamut according to an example embodiment.
Figure 4D:
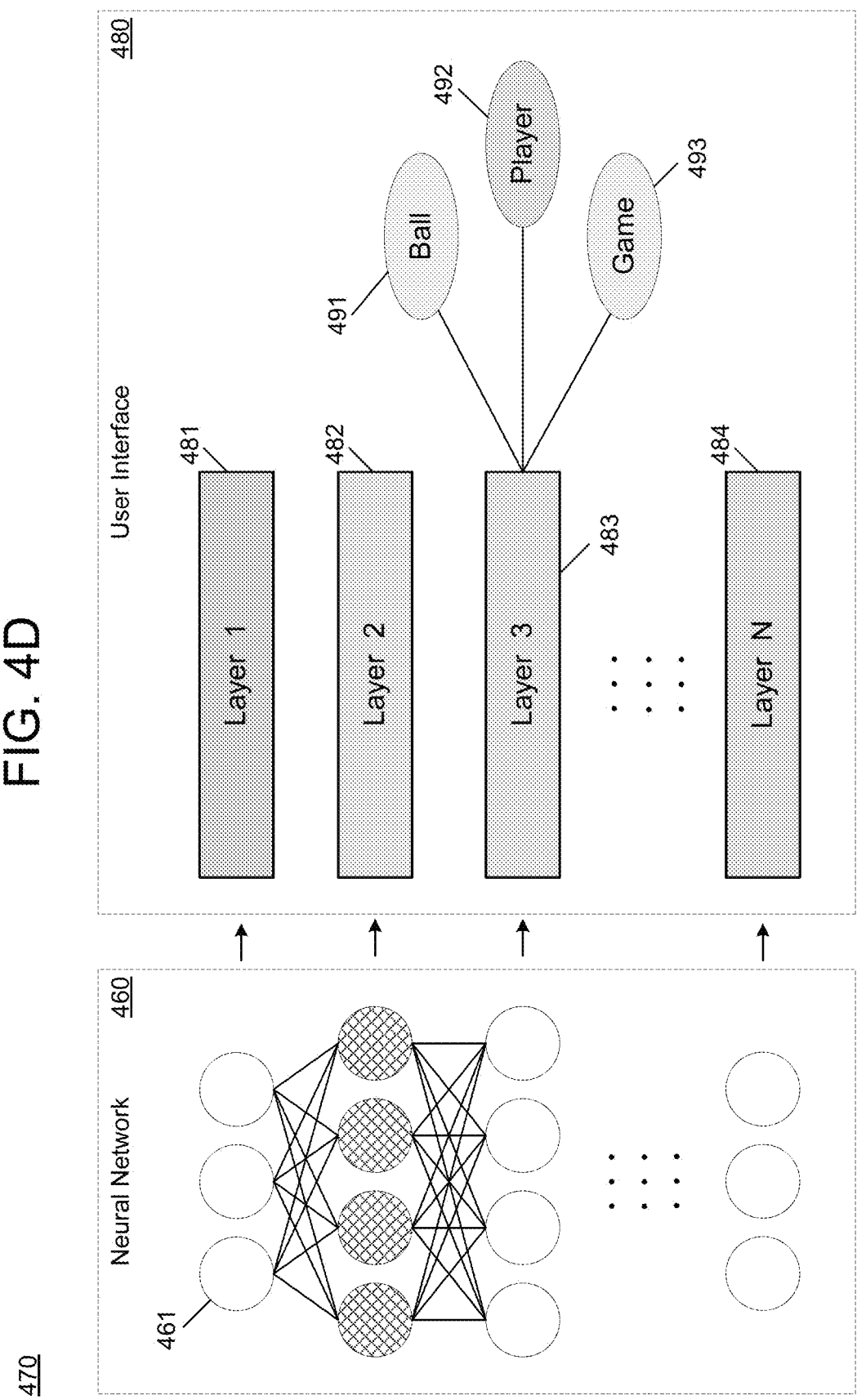
FIG. 4D is a diagram illustrating a process of labelling multiple layers of the neural network with color according to an example embodiment.

FIG. 4B illustrates a process 430 of decomposing a word vector 421 into a plurality of matrices 441, 442, and 443, to create a mapping to a color within the color gamut according to an example embodiment. Referring to FIG. 4B, a word vector 421 may be input into a vector decomposition process 440 which converts or otherwise transforms the word vector 421 into three sub-vectors (i.e., the matrices 441, 442, and 443.)

As an example, an original corpus of training data may be segmented, and a word bag that gathers all words may be generated. In this example, each word in the word bag may correspond to a different three-dimensional (3D) color in the HSV (Hue, Saturation, Value) color gamut vector. Here, the color value is attached and sorted according to the distance of the word vector in the vector space, and a value will be assigned from a light color to a dark color. This method of assignment can ensure that words with similar word vectors are attached with similar colors. For the original corpus, the original embedding representation (e.g., Word2Vec or BERT (Bidirectional Encoder Representations from Transformers), etc.) is obtained for each word in the original corpus such as each word in the string of text 410. Since the original corpus may be in the form of sentences, the result will be an M*N feature matrix (word vector 421) where M is the dimension of the word vector and N is the number of words in a feature matrix.

For the feature matrix (word vector 421) mentioned in the previous step, the host platform (e.g., training data impact visualization process 96) may perform a matrix decomposition of the word vector 421, and decompose each row of the feature matrix M*1 (i.e., word embedding marked as O) into an M*3 matrix (denoted as matrix 441), an identity matrix with dimensions of 3*3 (denoted as matrix 442) and a color matrix with dimensions of 3*1 (denoted as matrix 443). In these three matrices, it is necessary to predefine the matrix 443 of dimension 3*1 as the color vector corresponding to this vocabulary, the matrix 442 is the identity matrix (the diagonal is 1, and the remaining positions are 0), and the matrix 441 only needs to be guaranteed. The condition of O=A*B*C is sufficient. After decomposing each row of the characteristic matrix, the original M*N characteristic matrix (word vector 421) will be decomposed into the three matrices 441, 442, and 443.

In the subsequent neural network gradient calculation, all matrix operations in the neural network (such as convolution) need to be adapted to the matrix decomposition of the word vector 421, and all the matrices related to the matrix 443 (dimension 3*1 color vector). The calculated gradient of the backward propagation is set to 0, that is, the parameters of the matrix 443 do not change with the backward propagation. Because matrix 443 has the characteristic of maintaining stability in neural network calculations, it can be regarded as the data isotope of the word vector/feature vector. Furthermore, because the matrix 443 is initialized as a color vector in the HSV color space, it also has excellent visualization performance.

FIG. 4C illustrates a process 450 of labelling a layer (e.g., layer 2) of a neural network 460 with a label 463 that is colored according to an example embodiment. Here, the neural network 460 includes a plurality of nodes 461 that make up a plurality of layers, where each layer may include multiple nodes 461. Examples of layers in a neural network/deep learning neural network include convolution, pooling, concatenating, softmax, etc. To construct the data isotope, in the overall neural network training process, each feature matrix (e.g., word vector) may be split row by row via the above-mentioned vector decomposition process. Likewise, the corresponding parameter matrix corresponding to the neural network parameters may be deconstructed or otherwise disassembled into three parts, respectively. It is worth noting that since matrix 442 is the identity matrix, the backward propagation gradient of matrix 443 will be set to 0, so in the calculation process of the neural network (such as convolution or other feature extraction process) matrix 441 will be compressed into a vector form, matrix 442 will be compressed into a constant, while matrix 443 remains unchanged. Then the final calculation result of matrix 442 can be regarded as the scaling factor of matrix 443. In terms of intuitive visual effects, matrix 443 can be regarded as a color vector, while matrix 442 is a scaling factor that determines the color depth.

In the example of FIG. 4C, each of the features 462 (i.e., word vectors) extracted by a layer of the neural network 460 will be compressed at a vector level and projected into a certain label through softmax or pointer layer. Therefore, the color vectors corresponding to all the features and their depth scaling coefficients are also projected into the label 463 to form a mapping relationship. The accumulation or combination of colors results in a final color value for the label 463. Finally, the color vector and the scale factor corresponding to the label are displayed in the form of a color wheel, and a viewer/user can observe which color has the largest proportion in the label 463 through the color. In addition, since each color vector has a corresponding relationship with a word in the word bag, it is also possible to determine which words are the most important for this label, and complete the process of data tracing.

The reason for decomposing the word vector into three matrices is to give some feature invariance, namely the isotopic properties mentioned in the example embodiments, while the semantic features are unchanged. Because deep learning uses a method of reverse gradient propagation for model training and optimization, all operations are carried out in the matrix vector, but such steps will make each number in the matrix vector change making it impossible to trace. To address this, the host platform may decompose a large matrix (word vector) into three smaller matrices. The product of these three smaller matrices can restore this large matrix (word vector), but in the process of reverse gradient propagation, only the first two matrices change. Thus, the third matrix (which includes the assigned color) is unchanged, and can be used as a data isotope.

FIG. 4D illustrates a process 470 of labelling multiple layers (1-N) of a neural network 460 with different colored labels 481, 482, 483, and 484, respectively, via a user interface 480 according to an example embodiment. Here, the same process performed in FIG. 4C for the second layer (layer 2) may be performed for each layer of the neural network 460. Thus, each layer may be labeled with a respective color in the user interface 480 which will likely be different as long as the words that are consumed/extracted by each layer are different, which they usually are. Furthermore, the host system may also provide sample words 491, 492, and 493, along with the colors of the sample words, adjacent to the layers to provide the user with additional details via a user interface 480.

Figure 5:
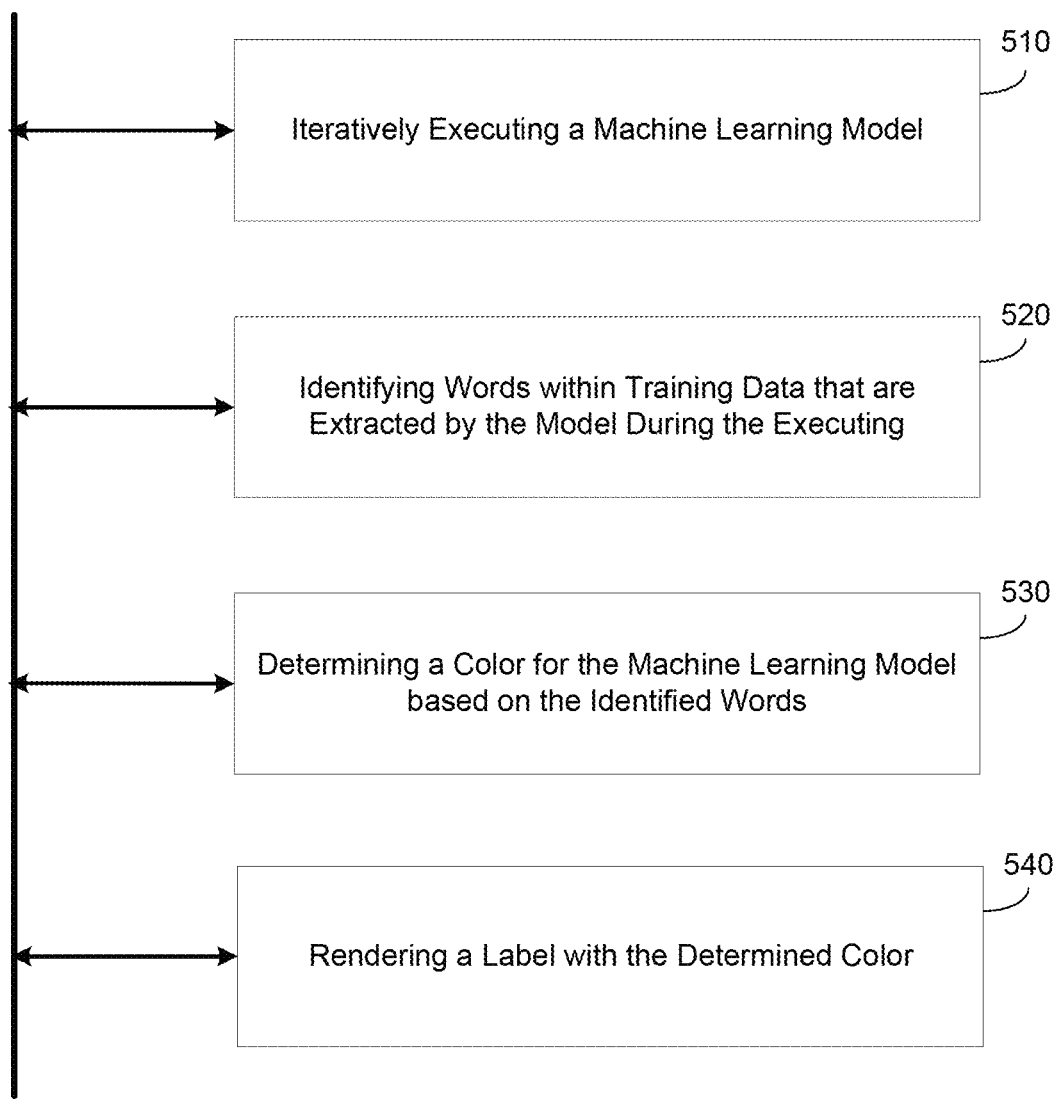
FIG. 5 is a diagram illustrating a method of generating visualization of an impact of training data on a machine learning model according to an example embodiment.

FIG. 5 illustrates a method 500 of generating a visualization of an impact of training data on a machine learning model according to an example embodiment. Referring to FIG. 5, in 510 the method may include executing a machine learning model on training data, where the training data comprises a plurality of word strings. As an example, the word strings may be sentences, fragments, paragraphs, user interface labels, and the like. The executing may include iteratively executing the machine learning model on the training data which has been converted into vector form. Here, the vector form includes numbers/data that is readable by the machine learning model. As the model continues to train, it may become more accurate in its predictions. At some point, a data scientists may stop the training or the training may automatically terminate after a condition such as a predetermined number of iterations, an end of the training data, and the like.

In 520, the method may include identifying words within the training data that are extracted by the machine learning model during the executing. In 530, the method may include determining a color for the machine learning model based on the identified words and a predefined mapping of words to colors. IN 540, the method may include rendering, via a user interface, a label associated with the machine learning model in the determined color for the machine learning model.

In some embodiments, the method may further include storing a file that comprises a plurality of different words mapped to a plurality of different colors, respectively, and the determining comprises determining the color for the machine learning model based on colors assigned to the identified words in the file. In some embodiments, the method may further include mapping a plurality of different words to a plurality of different colors via vector decomposition. In some embodiments, the determining the color comprises determining a plurality of colors for a plurality of layers within a neural network, respectively, and the rendering comprises rendering a visualization of the plurality of layers within the neural network in the plurality of determined colors, respectively.

In some embodiments, the identifying may include identifying a group of words that are extracted by a layer of the neural network, mapping each word in the group of words to a different respective color, and determining a final color for the layer of the neural network, wherein the final color is determined by accumulating different respective colors from the words in the group. In some embodiments, the method may further include rendering a visualization of the plurality of word strings via the user interface, wherein each word string is rendered with a different color based on words included in the respective word string. In some embodiments, the method may further include rendering a plurality of different words that are most impactful on the machine learning model, where the plurality of different words are rendered with a plurality of different colors.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
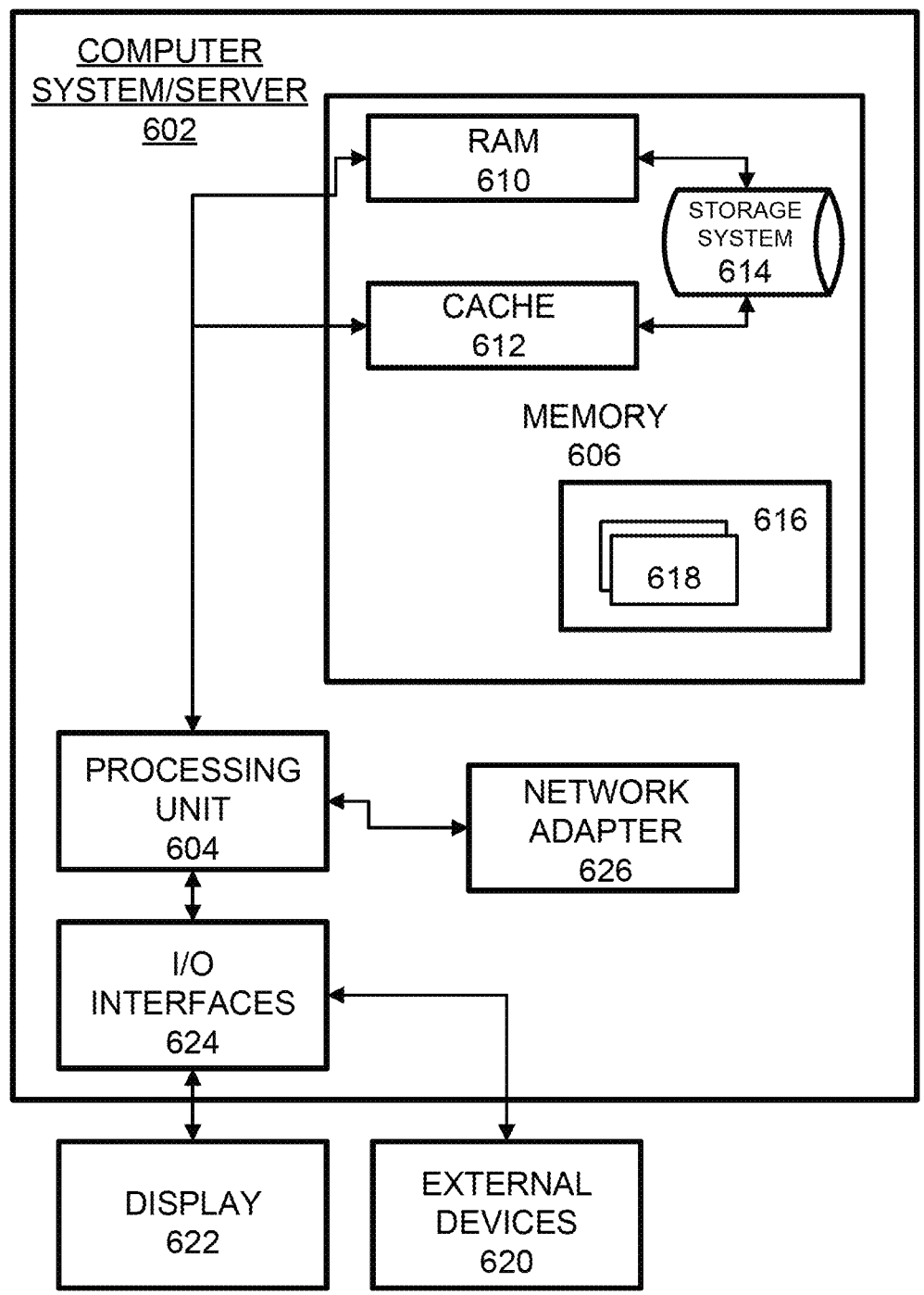
FIG. 6 is a diagram illustrating an example of a computing system that supports one or more of the example embodiments.

FIG. 6 illustrates an example system 600 that supports one or more of the example embodiments described and/or depicted herein. The system 600 comprises a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus comprising:
a processor that, when executing instructions stored in a memory, executes a machine learning model configured to:
receive training data comprising a plurality of word strings,
extract a plurality of words from the plurality of word strings,
convert the plurality of words into a plurality of word vectors,
decompose the plurality of word vectors into corresponding points in a color gamut to map the plurality of words to corresponding colors,
generate a label representing a layer of the machine learning model, wherein the label is assigned a color based on a combination of all of the corresponding colors mapped to the plurality of words, and cause a user interface to display the label.

2. The apparatus of claim 1, wherein the processor is further configured to:

retrieve a map of the plurality of words and the corresponding colors from a file.

3. The apparatus of claim 1, wherein the machine learning model is further configured to:

generate a plurality of sub-labels, wherein each sub-label corresponds to a particular word string of the plurality of word strings.

4. The apparatus of claim 1, wherein the machine learning model is configured to:

generate additional labels corresponding to additional layers of the machine learning model, wherein the additional layers are assigned colors based on the combination of all of the corresponding colors mapped to the plurality of words, and cause the user interface to display the additional labels.

5. The apparatus of claim 1, wherein the machine learning model comprises one or more additional layers, and wherein the machine learning model is further configured to:

identify a group of words by the machine learning model that is extracted from the plurality of word strings represented by the layer, identify additional groups of words by the machine learning model that are extracted from the plurality of word strings represented by the one or more additional layers, map each word in the group of words and the additional groups of words to a different color, and assign colors to the layer and each of the one or more additional layers based on an accumulation of different colors mapped to the group of words and the additional groups of words.

6. The apparatus of claim 1, wherein the processor is further configured to:

cause the user interface to display the plurality of word strings, wherein each word string of the plurality of word strings is rendered in a different color based on words included in a respective word string.

7. The apparatus of claim 1, wherein the color assigned to the label represents a level of effect on the machine learning model by the plurality of words.

8. A method comprising:

receiving training data by a machine learning model, wherein the training data comprises a plurality of word strings;

extracting a plurality of words from the plurality of word strings by the machine learning model;

converting the plurality of words into a plurality of word vectors by the machine learning model;

decomposing the plurality of word vectors into corresponding points in a color gamut by the machine learning model to map the plurality of words to corresponding colors;

generating by the machine learning model a label representing a layer of the machine learning model, wherein the label is assigned a color based on a combination of all of the corresponding colors mapped to the plurality of words; and causing by the machine learning model a user interface to display the label.

9. The method of claim 8, wherein the method further comprises:

retrieving a map of the plurality of words and the corresponding colors from a file.

10. The method of claim 8, wherein the method further comprises:

generating a plurality of sub-labels, wherein each sub-label corresponds to a particular word string of the plurality of word strings.

11. The method of claim 8, wherein assigning the color comprises:

generating additional labels corresponding to additional layers of the machine learning model, wherein the additional layers are assigned colors based on the combination of all of the corresponding colors mapped to the plurality of words; and causing the user interface to display the additional labels.

12. The method of claim 8, wherein the machine learning model comprises one or more additional layers, and wherein the method further comprises:

identifying a group of words by the machine learning model that is extracted from the plurality of word strings represented by the layer;

identifying additional groups of words by the machine learning model that are extracted from the plurality of word strings represented by the one or more additional layers;

mapping each word in the group of words and the additional groups of words to a different color; and assigning colors to the layer and each of the one or more additional layers based on accumulating different respective colors mapped to the group of words and the additional groups of words.

13. The method of claim 8, wherein the method further comprises:

causing the user interface to display the plurality of word strings, wherein each word string of the plurality of word strings is rendered in a different color based on words included in a respective word string.

14. The method of claim 8, wherein the color assigned to the label represents a level of effect on the machine learning model.

15. A non-transitory computer-readable storage medium comprising instructions that, when executed by a processor, cause the processor to perform:

receiving training data by a machine learning model, wherein the training data comprises a plurality of word strings;

extracting a plurality of words from the plurality of word strings by the machine learning model;

converting the plurality of words into a plurality of word vectors by the machine learning model;

decomposing the plurality of word vectors into corresponding points in a color gamut by the machine learning model to map the plurality of words to corresponding colors;

generating by the machine learning model a label representing a layer of the machine learning model, wherein the label is assigned a color based on a combination of all of the corresponding colors mapped to the plurality of words; and causing by the machine learning model a user interface to display the label.

16. The non-transitory computer-readable storage medium of claim 15, wherein the instructions further cause the processor to perform:

retrieving a map of the plurality of words and the corresponding colors from.

17. The non-transitory computer-readable storage medium of claim 15, wherein the instructions further cause the processor to perform:
   generating a plurality of sub-labels, wherein each sub-label corresponds to a particular word string of the plurality of word strings.

18. The non-transitory computer-readable storage medium of claim 15, wherein assigning the color comprises:
   generating additional labels corresponding to additional layers of the machine learning model, wherein the additional layers are assigned colors based on the combination of all of the corresponding colors mapped to the plurality of words; and
   causing the user interface to display the additional labels.

19. The non-transitory computer-readable storage medium of claim 18, wherein the machine learning model comprises one or more additional layers, and wherein the instructions further cause the processor to perform:
   identifying a group of words by the machine learning model that is extracted from the plurality of word strings represented by the layer;
   identifying additional groups of words by the machine learning model that are extracted from the plurality of word strings represented by the one or more additional layers;
   mapping each word in the group of words and the additional groups of words to a different color; and
   assigning colors to the layer and each of the one or more additional layers based on accumulating different respective colors mapped to the group of words and the additional groups of words.

20. The non-transitory computer-readable storage medium of claim 15, wherein the instructions further cause the processor to perform:
   causing the user interface to display the plurality of word strings, wherein each word string of the plurality of word strings is rendered in a different color based on words included in a respective word string.

* * * * *